United States Patent
Taura et al.

(10) Patent No.: US 8,126,490 B2
(45) Date of Patent: Feb. 28, 2012

(54) RADIO RECEIVER

(75) Inventors: Kenichi Taura, Tokyo (JP); Yuji Matsuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/811,657

(22) PCT Filed: Jan. 20, 2009

(86) PCT No.: PCT/JP2009/000180
§ 371 (c)(1),
(2), (4) Date: Jul. 2, 2010

(87) PCT Pub. No.: WO2009/113226
PCT Pub. Date: Sep. 17, 2009

(65) Prior Publication Data
US 2011/0009082 A1 Jan. 13, 2011

(30) Foreign Application Priority Data

Mar. 11, 2008 (JP) .................................. 2008-061268

(51) Int. Cl.
*H04B 7/00* (2006.01)
*H04B 1/00* (2006.01)
(52) U.S. Cl. ........................... 455/506; 455/65; 455/296
(58) Field of Classification Search .................... 455/65, 455/506, 134, 226.1, 296, 277.2, 278.1, 135, 455/222
See application file for complete search history.

(56) References Cited

U.S. PATENT DOCUMENTS

| 4,491,957 | A * | 1/1985 | Kamalski ......................... 381/13 |
| 4,538,285 | A * | 8/1985 | Gielis et al. .................... 375/351 |
| 4,751,734 | A * | 6/1988 | Rucktenwald ................... 381/13 |
| 5,390,344 | A * | 2/1995 | Nagata ............................ 455/220 |
| 6,738,610 | B1 * | 5/2004 | Wildhagen ..................... 455/296 |
| 7,155,245 | B2 * | 12/2006 | Yamamoto et al. ............ 455/506 |
| 2009/0295636 | A1 * | 12/2009 | Taniguchi et al. ............. 342/378 |
| 2010/0203855 | A1 * | 8/2010 | Komiyama ................ 455/150.1 |

FOREIGN PATENT DOCUMENTS

| JP | 2002-335129 A | 11/2002 |
| JP | 2003-69436 A | 3/2003 |
| JP | 2004-80693 A | 3/2004 |
| JP | 3733937 B2 | 1/2006 |

* cited by examiner

*Primary Examiner* — Sonny Trinh
(74) *Attorney, Agent, or Firm* — Birch, Stewart, Kolasch & Birch, LLP (57) ABSTRACT

A radio receiver (FM radio receiver) has an amplitude detecting section (13) for detecting the amplitude level of a received radio wave; a multipath occurrence state detecting section (14) for monitoring the amplitude level, and for detecting the degree of a multipath occurrence state; a multipath occurrence state deciding section (15) for deciding the operation limiting level of the amplitude correction according to the degree of the multipath occurrence state; a receiving condition deciding section (20) for deciding receiving conditions of the radio wave; and a limiting level deciding section (21) for adjusting the operation limiting level of the amplitude correction output from the multipath occurrence state deciding section (15) according to a receiving condition decision result output from the receiving condition deciding section (20), and suppresses the multipath noise by imposing operation limitations on the amplitude correction of the FM demodulator 9.

4 Claims, 10 Drawing Sheets

RADIO RECEIVER

TECHNICAL FIELD

The present invention relates to a radio receiver for receiving a carrier wave passing through FM (Frequency Modulation), and for performing demodulation using digital signal processing, for example, and particularly to a radio receiver preferably used as an onboard FM radio receiver.

BACKGROUND ART

In radio receivers such as radios, televisions, or mobile phones, deterioration of reception quality due to multipath noise becomes a problem. The multipath noise is caused by receiving the same radio waves (delayed waves) passing through a plurality of paths because a radio wave transmitted from a broadcasting station or base station is reflected or diffracted by obstacles such as buildings or ground.

In particular, as for an onboard FM radio receiver, since it is mounted on a vehicle and moves, its receiving conditions involving multipath occurrence fluctuate moment by moment. Accordingly, suppressing the multipath noise by carrying out appropriate control in accordance with the receiving conditions is an important design matter.

As to a method of suppressing the multipath noise by carrying out appropriate control in accordance with the receiving conditions, many applications have been submitted previously. For example, although an occurrence of the multipath can bring about rasping noise (distortion) because of an increase of high frequency components of an audio signal, a method is known for attenuating the high frequency components to counteract the noise of the high frequency components. In addition, an occurrence of the multipath can cause a harmful effect called stereo distortion that hampers correct stereo separation because of a distortion effect on a stereo pilot signal. Against the stereo distortion, a method is known which produces a monaural signal (see Patent Document 1 for both methods).

Patent Document 1: Japanese Patent Laid-Open No. 2003-69436 (Paragraphs [0006]-[0007]).

Figure 13:
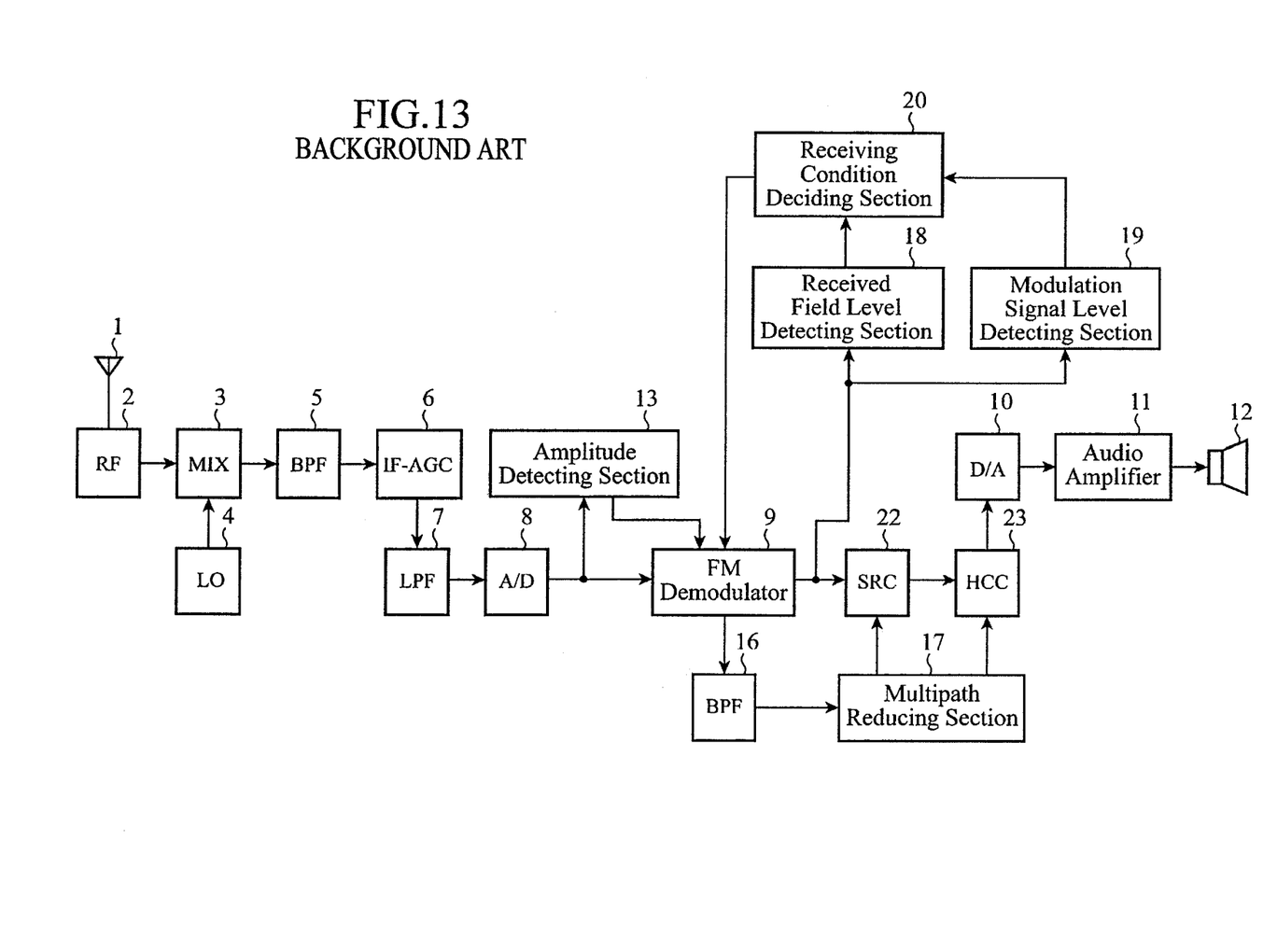
FIG. 13 is a block diagram showing an example of an internal configuration of a conventional FM radio receiver.

FIG. 13 shows an internal configuration of a typical conventional FM radio receiver. In FIG. 13, FM waves received with an antenna 1 are amplified with a radio frequency amplifier (RF) 2, pass through frequency conversion with a frequency converter (MIX) 3, and are deprived of undesired components such as adjacent channel waves through an intermediate frequency filter (BPF) 5. The FM wave passing through the intermediate frequency filter 5 is subjected to the amplitude limitation with a limiting intermediate frequency amplifier 6 (IF-AGC) and to the removal of high frequency components of the intermediate frequency with a pre-filter (LPF) 7, and is converted to a digital signal through an analog-digital converter (A/D) 8. Then, the FM wave converted to the digital signal is demodulated with an FM demodulator 9, is converted to an analog audio signal with a digital-analog converter (D/A) 10, and is supplied to a speaker 12 via an audio amplifier 11.

In the foregoing configuration, although the multipath occurrence brings about the rasping noise because of an increase of the high frequency components of the audio signal (distortion), a frequency characteristic setting section (HCC) 23 attenuates the high frequency components to counteract the noise of the high frequency components. In addition, although the harmful effect called stereo distortion occurs which hampers the correct stereo separation because of the effect of the distortion on the stereo pilot signal, a separation setting section (SRC) 22 carries out appropriate control in accordance with the receiving conditions by producing a monaural signal against the stereo distortion, thereby suppressing the multipath noise.

Thus, according to the output of a bandpass filter (BPF) 16, the separation setting section 22 and the frequency characteristic setting section 23 are controlled in accordance with the noise occurrence states. Besides, to suppress the occurrence of the multipath noise itself, the operation limitations are imposed on the amplitude correction in the FM demodulator 9.

As control parameters for the operation limitations on the amplitude correction, using the receiving conditions based on the received field level and modulation signal level, a receiving condition deciding section 20 decides the receiving conditions from the output of a received field level detecting section 18 and the output of a modulation signal level detecting section 19, and carries out the control of the operation limiting level in accordance with the receiving conditions.

As described above, according to the conventional FM radio receiver, it suppresses the multipath noise by imposing the operation limitations on the amplitude correction in the FM demodulator. In addition, as the control parameters of the operation limitations on the amplitude correction, it employs the receiving conditions based on at least one of the received field level and modulation signal level or both of them.

However, the control parameters do not take into account the multipath occurrence state. Accordingly, a problem arises, for example, in that the multipath distortion can occur in strong multipath occurrence state because of the insufficient operation limiting level of the amplitude correction, but that the audio distortion can occur in weak multipath occurrence state because of the excessive operation limiting level of the amplitude correction.

The present invention is implemented to solve the foregoing problems. Therefore it is an object of the present invention to provide a radio receiver capable of further improving the reception quality by suppressing the multipath noise by carrying out appropriate control in accordance with the receiving conditions taking the multipath occurrence state into account.

DISCLOSURE OF THE INVENTION

To solve the foregoing problems, a radio receiver in accordance with the present invention includes an amplitude detecting section for detecting an amplitude level of a received radio wave; a multipath occurrence state detecting section for monitoring the amplitude level output from the amplitude detecting section, and for detecting a degree of a multipath occurrence state; a multipath occurrence state deciding section for deciding an operation limiting level of the amplitude correction according to the degree of the multipath occurrence state detected by the multipath occurrence state detecting section; a receiving condition deciding section for deciding receiving conditions of the radio wave according to at least one of a received field level and a modulation signal level; and a limiting level deciding section for adjusting the operation limiting level of the amplitude correction output from the multipath occurrence state deciding section according to a receiving condition decision result output from the receiving condition deciding section, and suppresses the multipath noise by imposing operation limitations on the amplitude correction of the demodulator.

According to the radio receiver in accordance with the present invention, it can further improve the reception quality by suppressing the multipath noise by carrying out appropriate control in accordance with the receiving conditions taking the multipath occurrence state into account.

BEST MODE FOR CARRYING OUT THE INVENTION

The best mode for carrying out the invention will now be described with reference to the accompanying drawings to explain the present invention in more detail.

Embodiment 1

Figure 1:
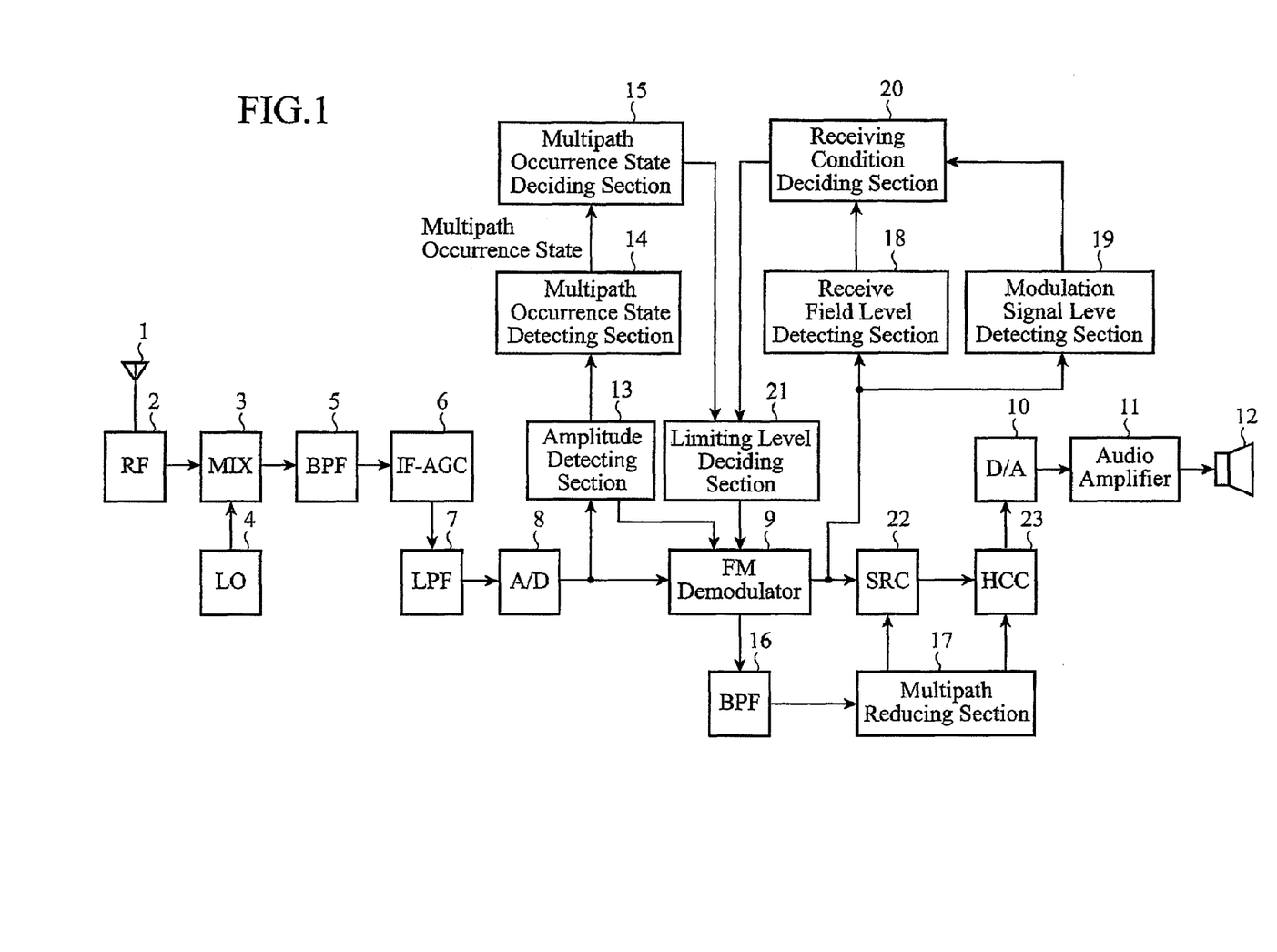
FIG. 1 is a block diagram showing an internal configuration of a radio receiver of an embodiment 1 in accordance with the present invention.

FIG. 1 is a block diagram showing an internal configuration of a radio receiver of an embodiment 1 in accordance with the present invention. Here, an FM radio receiver is shown as an example of the radio receiver.

As shown in FIG. 1, the FM radio receiver comprises an antenna 1, a radio frequency amplifier (RF) 2, a frequency converter (MIX) 3, a local oscillator (LO) 4, an intermediate frequency filter (BPF) 5, a limiting intermediate frequency amplifier (IF-AGC) 6, a pre-filter (LPF) 7, an analog-digital converter (A/D) 8, an FM demodulator 9, a digital-analog converter (D/A) 10, an audio amplifier 11, a speaker 12, an amplitude detecting section 13, a multipath occurrence state detecting section 14, a multipath occurrence state deciding section 15, a bandpass filter (BPF) 16, a multipath reducing section 17, a received field level detecting section 18, a modulation signal level detecting section 19, a receiving condition deciding section 20, a limiting level deciding section 21, a separation setting section (SRC) 22, and a frequency characteristic setting section (HCC) 23.

As clearly seen by comparing it with the conventional example shown in FIG. 13, the FM radio receiver, which is the radio receiver of the embodiment 1 in accordance with the present invention, includes the multipath occurrence state detecting section 14, the multipath occurrence state deciding section 15 and the limiting level deciding section 21 in addition to the configuration of the conventional FM radio receiver.

More specifically, the multipath occurrence state detecting section 14 detects the degree of the multipath occurrence state by monitoring the amplitude level output from the amplitude detecting section 13, and supplies it to the multipath occurrence state deciding section 15. The multipath occurrence state deciding section 15 decides the operation limiting level of the amplitude correction according to the degree of the multipath occurrence state detected by the multipath occurrence state detecting section 14, and supplies it to the limiting level deciding section 21. The limiting level deciding section 21 also receives from the receiving condition deciding section 20 the receiving conditions of the radio wave in terms of one of the received field level and the modulation signal level or both of them. The limiting level deciding section 21 adjusts the operation limiting level of the amplitude correction, which is output from the multipath occurrence state deciding section 15, according to the decision result of the receiving conditions output from the receiving condition deciding section 20, and supplies it to the FM demodulator 9 to suppress the multipath noise by setting the operation limitations on the amplitude correction of the FM demodulator 9.

Incidentally, as for the multipath occurrence state detecting section 14, the multipath occurrence state deciding section 15 and the limiting level deciding section 21, they are realized in the concrete by a DSP (Digital Signal Processor) or a MPU (Micro Processor Unit) or a combination of them together with the separation setting section (SRC) 22 and frequency characteristic setting section (HCC) 23. More specifically, by cooperating with a peripheral LSI (such as FM demodulator 9) according to programs that are installed in the DSP or MPU or stored in an external memory, it implements the foregoing functions of the multipath occurrence state detecting section 14, multipath occurrence state deciding section 15 and limiting level deciding section 21. Its details will be described below.

Figure 2:
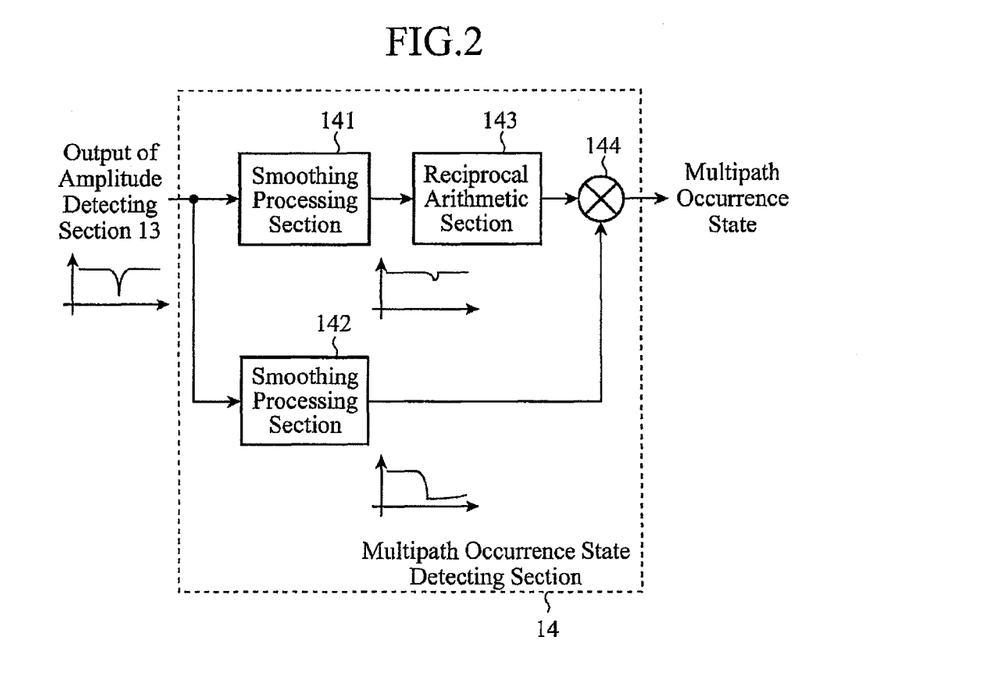
FIG. 2 is a block diagram showing an internal configuration of the multipath occurrence state detecting section of the radio receiver of the embodiment 1 in accordance with the present invention.

FIG. 2 is a diagram showing an example of the internal configuration of the multipath occurrence state detecting section 14 shown in FIG. 1. As shown in FIG. 2, the multipath occurrence state detecting section 14 comprises smoothing processing sections 141 and 142, a reciprocal arithmetic section 143 and a multiplier 144.

In the foregoing configuration, the amplitude level detected by the amplitude detecting section 13 shown in FIG. 1 is supplied to the smoothing processing sections 141 and 142. When the multipath occurs, an instantaneous drop occurs in the amplitude level as is well known.

The smoothing processing section 141 sets a large time constant for the direction in which the amplitude level decreases, and a small time constant for the direction in which the amplitude level increases. Thus, the smoothing processing section 141 does not follow the instantaneous drop, and can detect the high level of the amplitude. On the other hand, the smoothing processing section 142 sets a small time constant for the direction in which the amplitude level decreases, and a large time constant for the direction in which the amplitude level increases. Thus, it follows the instantaneous drop, and can detect the low level of the amplitude.

The reciprocal arithmetic section 143 outputs the reciprocal of the output of the smoothing processing section 141, and the multiplier 144 multiplies the output of the smoothing processing section 142 by the reciprocal, thereby normalizing the drop of the amplitude.

The multiplication output from the multiplier 144 is small when the drop of the amplitude is large, and is large when the drop of the amplitude is small. Accordingly, it is found that the multipath occurrence state is strong in the direction toward which the multiplication output becomes small, and is weak in the direction toward which the multiplication output becomes large. Thus, the multipath occurrence state is detected by detecting and normalizing the instantaneous drop of the carrier wave amplitude level. This makes such a decision possible that a large detection value means strong multipath, and a small detection value means weak multipath.

Figure 3:
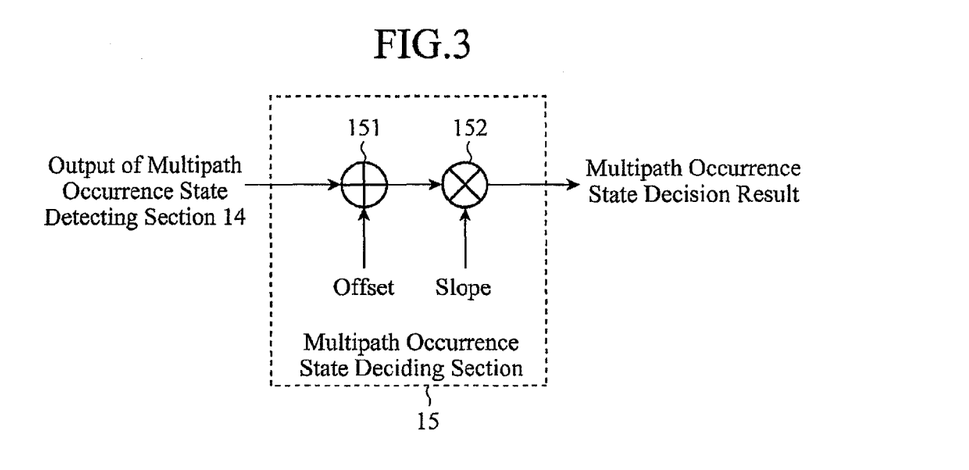
FIG. 3 is a block diagram showing an internal configuration of the multipath occurrence state deciding section of the radio receiver of the embodiment 1 in accordance with the present invention.

FIG. 3 is a diagram showing an example of an internal configuration of the multipath occurrence state deciding section 15 shown in FIG. 1. As shown in FIG. 3, the multipath occurrence state deciding section 15 comprises an adder 151 and a multiplier 152.

In the foregoing configuration, the adder 151 adds an offset to the multipath occurrence state detected by the multipath occurrence state detecting section 14 shown in FIG. 1 and FIG. 2, and the multiplier 152 multiplies by a slope. The multiplication result is supplied to the limiting level deciding section 21 shown in FIG. 1 as the operation limiting level of the amplitude correction. Setting the offset and the slope as parameters enables the adjustment of the operation limiting level of the amplitude correction against the multipath occurrence state.

Figure 4:
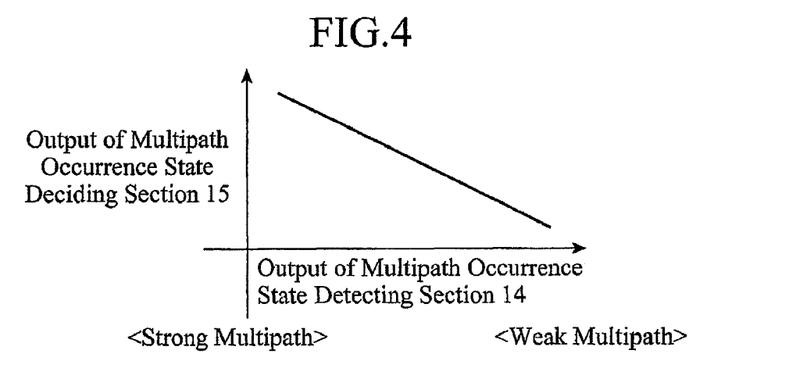
FIG. 4 is a diagram illustrating the operation of the multipath occurrence state deciding section of the radio receiver of the embodiment 1 in accordance with the present invention.

FIG. 4 shows an example of the operation of the multipath occurrence state deciding section 15. FIG. 4 is a graph having the horizontal axis showing the output of the multipath occurrence state detecting section 14 and the vertical axis showing the output of the multipath occurrence state deciding section 15. The operation of the multipath occurrence state deciding section 15 is schematically shown on the graph.

Here, the multipath occurrence state deciding section 15 operates in such a manner that when the multipath occurrence state is small, that is, when the degree of the multipath occurrence is strong, the multipath occurrence state decision output becomes large. In contrast, the multipath occurrence state deciding section 15 operates in such a manner that when the multipath occurrence state is large, that is, when the degree of the multipath is weak, the multipath occurrence state decision output becomes small. Here, the large multipath occurrence state decision output means a high multipath suppression effect, and a small multipath occurrence state decision output means a low multipath suppression effect.

Figure 5:
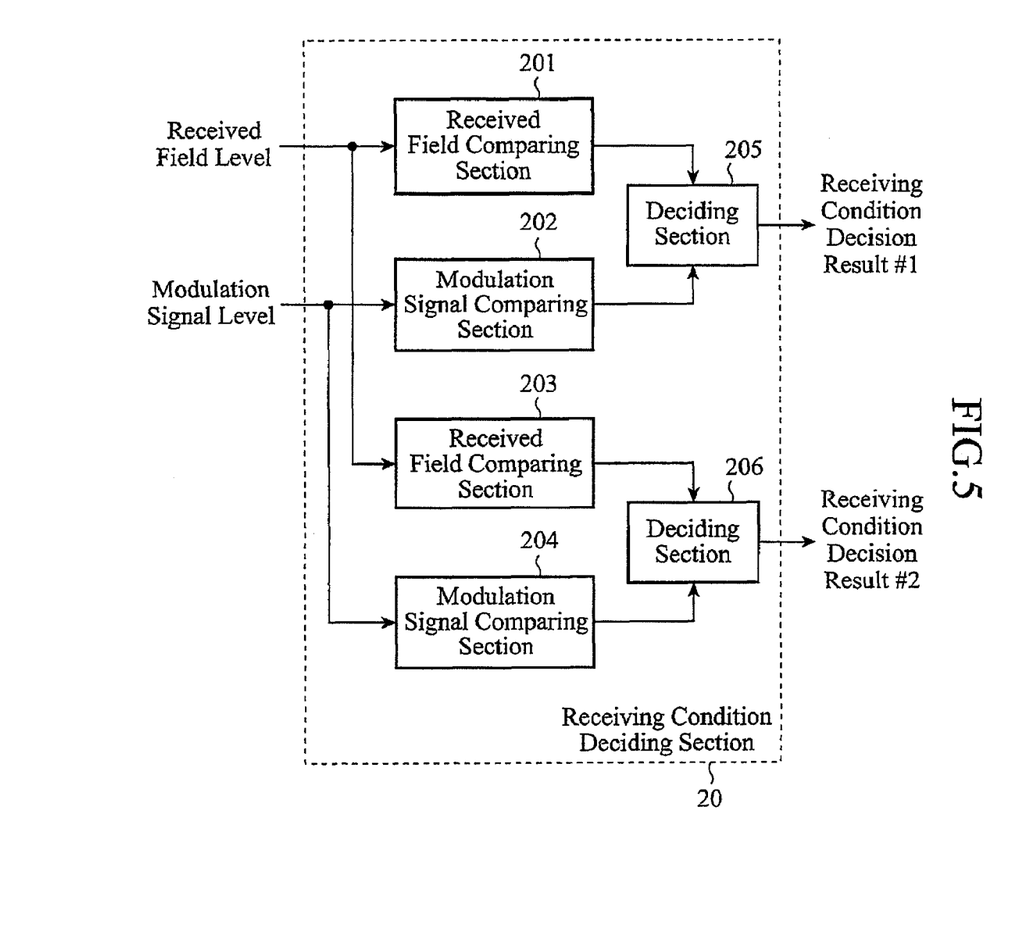
FIG. 5 is a block diagram showing an internal configuration of the receiving condition deciding section of the radio receiver of the embodiment 1 in accordance with the present invention.

FIG. 5 is a diagram showing an example of an internal configuration of the receiving condition deciding section 20 shown in FIG. 1. As shown in FIG. 5, the receiving condition deciding section 20 comprises received field comparing sections 201 and 203, modulation signal comparing sections 202 and 204, and deciding sections 205 and 206.

In the foregoing configuration, the received field comparing section 201 compares the input received field level with a preset threshold with at least one or more steps, and supplies the deciding section 205 with the relation of the received field level and the threshold at that point. Likewise, the modulation signal comparing section 202 compares the input modulation signal level with a preset threshold with at least one or more steps, and supplies the deciding section 205 with the relation of the input modulation signal level and the threshold at that point.

On the other hand, the received field comparing section 203 compares the input received field level with a preset threshold with at least one or more steps, and supplies the deciding section 206 with the relation of the received field level and the threshold at that point. Likewise, the modulation signal comparing section 204 compares the input modulation signal level with a preset threshold with at least one or more steps, and supplies the deciding section 206 with the relation of the input modulation signal level and the threshold at that point.

Figure 6:
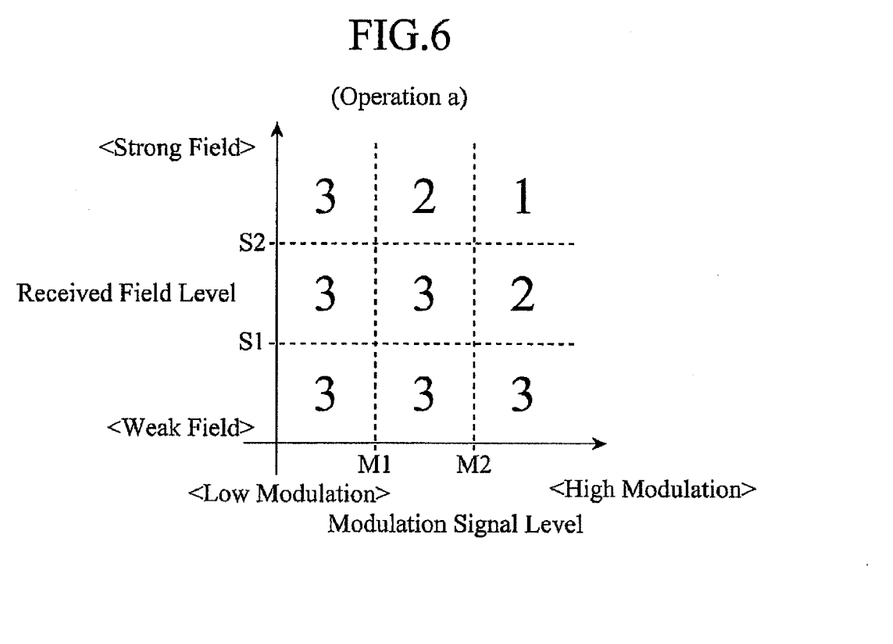
FIG. 6 is a diagram illustrating the operation (operation a) of the receiving condition deciding section of the radio receiver of the embodiment 1 in accordance with the present invention.

FIG. 6 is a schematic diagram showing on a graph an example of the operation (operation a) of the received field comparing section 201, modulation signal comparing section 202 and deciding section 205 in the receiving condition deciding section 20.

Here, for the sake of simplicity, the following description will be given on the assumption that the decisions are made using the modulation signal level and received field level with three steps each. More specifically, thresholds M1 and M2 are provided for the modulation signal level to divide it into three sections from low to high modulation. Likewise, thresholds S1 and S2 are provided for the received field level to divide it into three sections from weak to strong field. In FIG. 6, FIGS. 1-3 denote a limiting level each, where the limiting level 1 is the lowest in which the suppression effect of the multipath noise is smallest, and the limiting level 3 is the highest in which the suppression effect of the multipath noise is greatest. The deciding section 205 supplies the limiting level 1-3 determined according to the received field level and the modulation signal level to the limiting level deciding section 21 as a receiving condition decision result #1.

Figure 7:
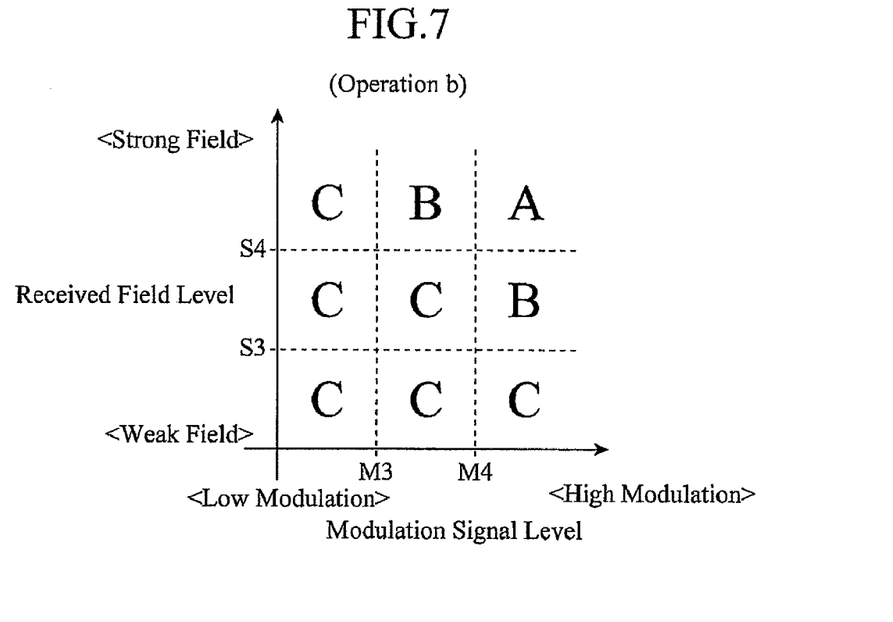
FIG. 7 is a diagram illustrating the operation (operation b) of the receiving condition deciding section of the radio receiver of the embodiment 1 in accordance with the present invention.

FIG. 7 is a schematic diagram showing on a graph an example of the operation (operation b) of the received field comparing section 203, modulation signal comparing section 204 and deciding section 206 in the receiving condition deciding section 20.

Here, for the sake of simplicity, the following description will be given on the assumption that the decisions are made using the modulation signal level and received field level with three steps each. More specifically, thresholds M3 and M4 are provided for the modulation signal level to divide it into three sections from low to high modulation. Likewise, thresholds S3 and S4 are provided for the received field level to divide it into three sections from weak to strong field. In FIG. 7, letters A-C denote a coefficient input to the limiting level deciding section 21 each, where the coefficient A is the lowest setting in which the suppression effect of the multipath noise is smallest, and the coefficient C is the highest setting in which the suppression effect of the multipath noise is greatest. The deciding section 206 supplies the limiting level A-C determined according to the modulation signal level and the received field level to the limiting level deciding section 21 as a receiving condition decision result #2.

Figure 8:
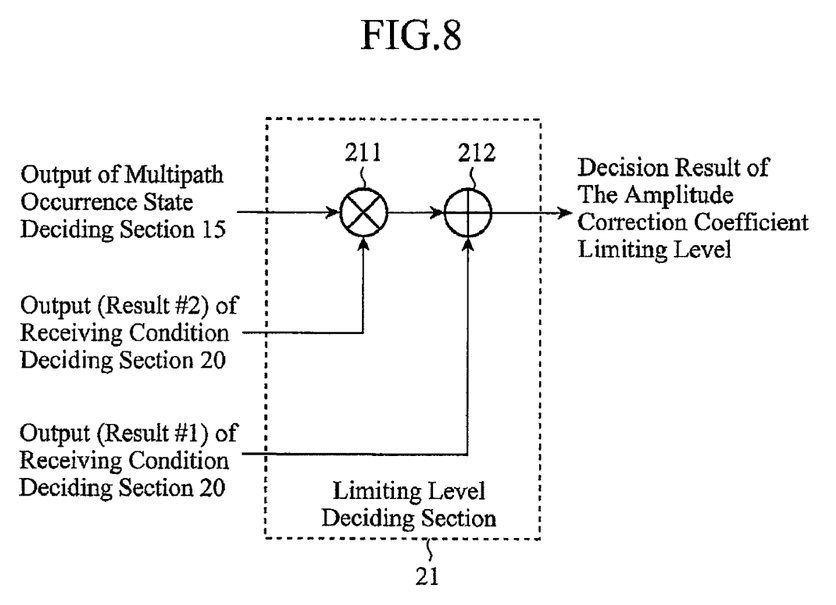
FIG. 8 is a block diagram showing an internal configuration of the limiting level deciding section of the radio receiver of the embodiment 1 in accordance with the present invention.

FIG. 8 is a diagram showing an example of the internal configuration of the limiting level deciding section 21 shown in FIG. 1. As shown in FIG. 8, the limiting level deciding section 21 comprises a multiplier 211 and an adder 212.

In the foregoing configuration, the multiplier 211 multiplies the decision output supplied from the multipath occurrence state deciding section 15 shown in FIG. 1 by the receiving condition decision result #2 supplied from the receiving condition deciding section 20 (deciding section 206), and supplies the multiplication result to the adder 212. The adder 212 adds the receiving condition decision result #1 output from the receiving condition deciding section 20 (deciding section 205) to the multiplication result of the multiplier 211, and supplies the addition result to the FM demodulator 9 as the limiting level decision result of an amplitude correction coefficient (the operation limiting level of the amplitude correction).

Figure 9:
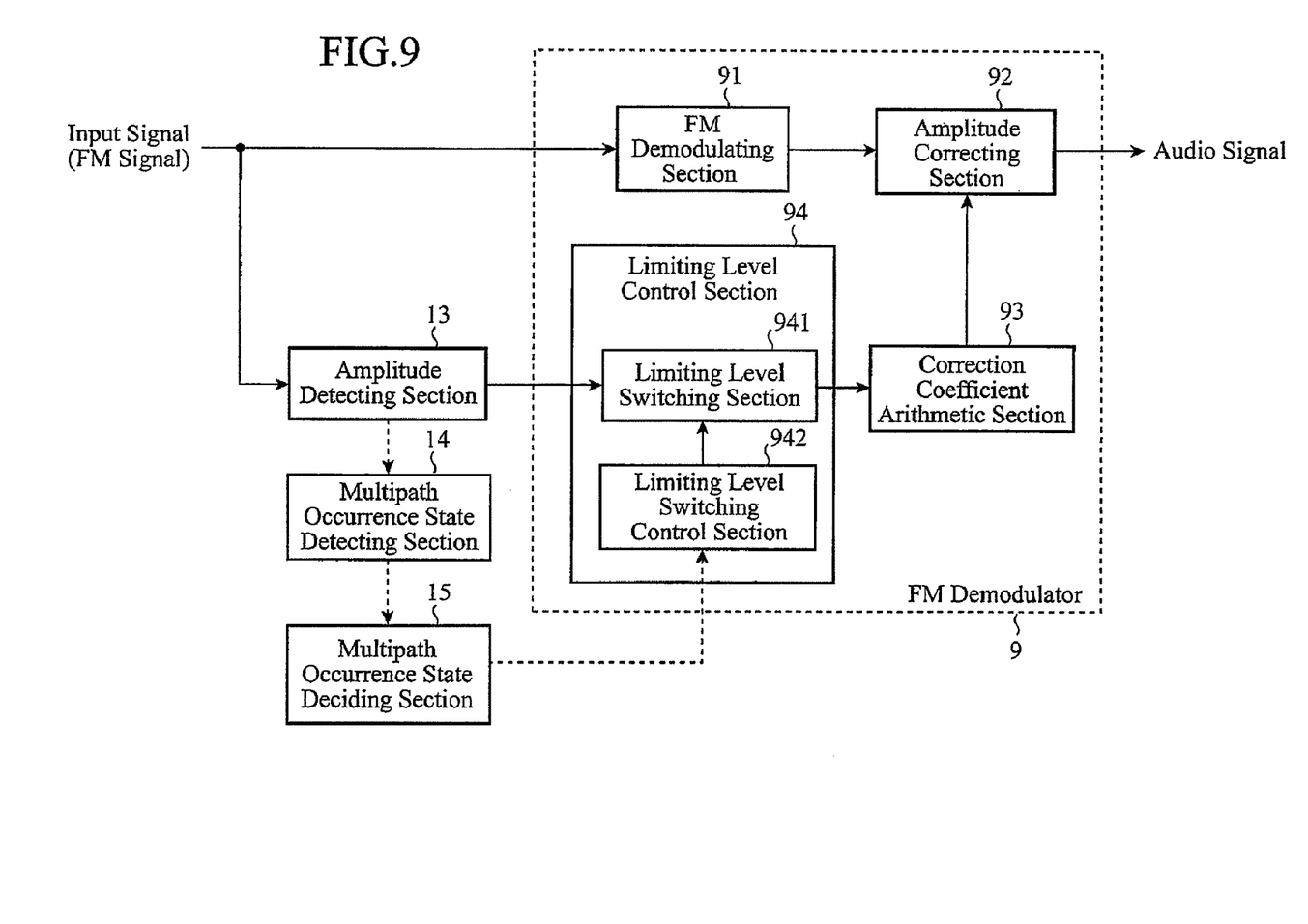
FIG. 9 is a block diagram showing a circuit configuration of the FM demodulator and its surroundings shown for explaining the operation of the radio receiver of the embodiment 1 in accordance with the present invention.

FIG. 9 is a block diagram showing a circuit configuration of the FM demodulator 9 and its surroundings when using the multipath occurrence state as a parameter for controlling the operation limitations on the amplitude correction.

The operation of the radio receiver of the embodiment 1 in accordance with the present invention (FM radio receiver) will be described in detail with reference to FIG. 9.

Here, the operation principle of the FM modulation by the FM demodulator 9 will be described briefly, first. To extract the modulation signal from the FM wave, the FM demodulator 9 that fulfills the following two conditions is required: the amplitude of the output signal varies in accordance with the frequency variation of the input FM signal (condition #1); and the amplitude of the output signal does not respond to the amplitude variation of the input FM signal (condition #2). Incidentally, although there are various conditions required from the FM demodulator 9, they will be omitted for the sake of simplicity.

As shown in FIG. 9, the FM demodulator 9 comprises an FM demodulating section 91, an amplitude correcting section 92, a correction coefficient arithmetic section 93, and a limiting level control section 94.

The FM demodulating section 91 demodulates the input signal (FM signal), and outputs to the amplitude correcting section 92. Although the output satisfies the foregoing condition #1, it does not satisfy the condition #2. In other words, the output of the FM demodulating section 91 includes amplitude variation responding components of the input signal. The amplitude correcting section 92 removes the amplitude variation responding components from the output of the FM demodulating section 91. In addition, the correction coefficient arithmetic section 93 detects the amplitude of the input signal, generates the amplitude correction coefficient proportional to the reciprocal of the amplitude, and supplies to the amplitude correcting section 92. The amplitude correcting section 92 removes the amplitude variation responding components from the output signal by multiplying the output signal of the FM demodulating section 91 and the correction coefficient which is the output of the correction coefficient arithmetic section 93, and supplies the demodulated audio signal satisfying the condition #1 and condition #2 to the received field level detecting section 18, modulation signal level detecting section 19, BPF 16 and SRC 22 shown in FIG. 1.

The limiting level control section 94 comprises a limiting level switching section 941 and a limiting level switching control section 942.

The limiting level switching section 941 compares the amplitude detected by the amplitude detecting section 13 with a reference value under the control of the limiting level switching control section 942, and operates as follows: when the output of the amplitude detecting section 13 is greater than the reference value, for example, it supplies the output of the amplitude detecting section 13 to the correction coefficient arithmetic section 93 as it is; on the contrary, when it is less than the reference value, it outputs the decision result of the limiting level deciding section 21. Incidentally, as for the operation of the FM demodulator 9 in the case where the output of the amplitude detecting section 13 is supplied to the correction coefficient arithmetic section 93 as it is, the operation is the same as that of the conventional operation.

By the way, under the strong multipath state, the output of the multipath occurrence state deciding section 15 becomes large, and when the modulation signal level and the received field level are low, the receiving condition decision results #1 and #2 become large. As a result, the decision result of the amplitude correction coefficient limiting level, which is output from the limiting level deciding section 21, is large, and hence the multipath noise suppression effect is great.

In contrast, under the weak multipath state, the multipath occurrence state decision output becomes small, and when the modulation signal level and the received field level are high, the receiving condition decision results #1 and #2 become small. As a result, the decision result of the amplitude correction coefficient limiting level, which is output from the limiting level deciding section 21, is small, and hence the multipath noise suppression effect is small.

As described above, according to the embodiment 1, using the multipath occurrence state as one of the parameters for controlling the operation limitations on the amplitude correction, it can suppress the omission of removing the multipath noise due to the insufficient operation limiting level of the amplitude correction, and can suppress the occurrence of the audio distortion due to the excessive operation limiting level of the amplitude correction.

More specifically, when the output of the amplitude detecting section 13 is smaller than the reference value, the limiting level control section 94 (limiting level switching section 941) of the FM demodulator 9 supplies the correction coefficient arithmetic section 93 with the decision result of the multipath occurrence state deciding section 15, thereby being able to reduce the multipath noise effectively when the multipath occurrence is large, and to prevent the harmful effect that the audio distortion occurs because of the excessive operation limitations on the amplitude correction when the multipath occurrence is small.

Embodiment 2

Figure 10:
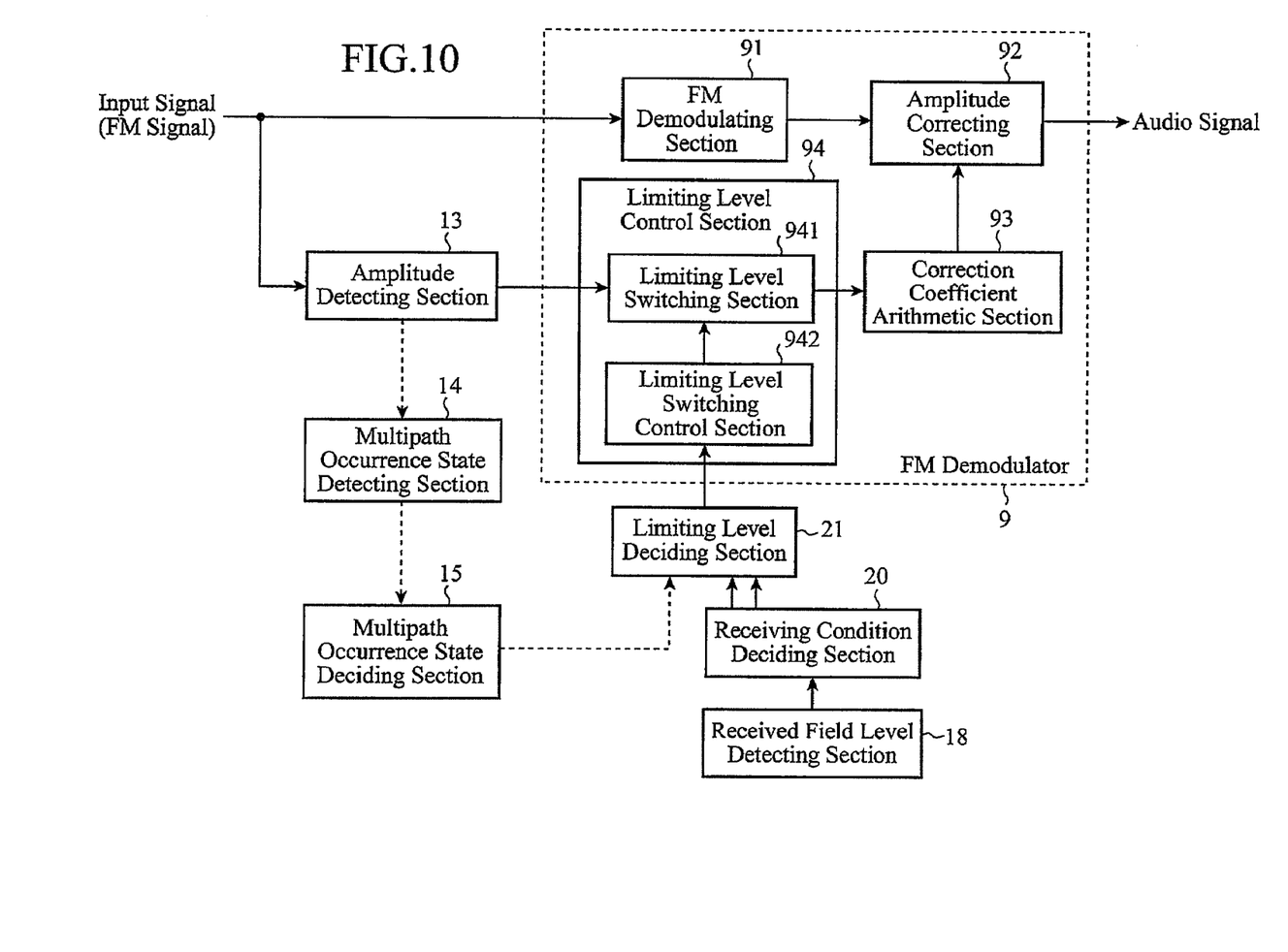
FIG. 10 is a block diagram showing a circuit configuration of the FM demodulator and its surroundings shown for explaining the operation of a radio receiver of an embodiment 2 in accordance with the present invention.

FIG. 10 is a block diagram showing a circuit configuration of the FM demodulator 9 and its surroundings when using the multipath occurrence state and received field level as the parameters for controlling the operation limitations on the amplitude correction.

The operation of the radio receiver (FM radio receiver) of the embodiment 2 in accordance with the present invention will now be described in detail with reference to FIG. 10 below.

The embodiment 2 has a configuration different from the embodiment 1 shown in FIG. 9 in that it supplies the limiting level control section 94 (the limiting level switching control section 942 thereof) of the FM demodulator 9 not only with the multipath occurrence state from the multipath occurrence state deciding section 15, but also with the output of the limiting level deciding section 21 that decides the operation limiting level of the amplitude correction according to the multipath occurrence state and the received field level by the received field level detecting section 18.

More specifically, when the received field level is low, the occurrence frequency of the multipath noise increases, and when the received field level is high, the occurrence frequency of the multipath noise decreases. Accordingly, it is possible to operate, according to the output of the limiting level deciding section 21, in such a manner as to tighten the operation limitations on the amplitude correction when the multipath occurrence is large and the received field level is in the direction of reduction, and to lighten the operation limitations on the amplitude correction when the multipath occurrence is small and the received field level is in the direction of increase.

As described above, according to the embodiment 2, detecting the multipath occurrence state and the received field level and using them as the parameters for controlling the operation limitations on the amplitude correction, it can suppress the shortage of removing the multipath noise due to the insufficient operation limiting level of the amplitude correction, and suppress the occurrence of the audio distortion due to the excessive operation limiting level of the amplitude correction.

More specifically, when the output of the amplitude detecting section 13 is smaller than the reference value, the limiting level control section 94 (limiting level switching section 941) of the FM demodulator 9 supplies the correction coefficient arithmetic section 93 with the decision result of the limiting level deciding section 21, thereby being able to tighten the operation limitations on the amplitude correction when the multipath occurrence is large and the received field level is in the direction of reduction, and to lighten the operation limitations on the amplitude correction when the multipath occurrence is small and the received field level is in the direction of increase. Accordingly, the embodiment 2 can reduce the multipath noise effectively, and can prevent the harmful effect that the audio distortion occurs because of the excessive operation limitations on the amplitude correction by lightening the operation limitations on the amplitude correction when the multipath occurrence is small and the received field level is in the direction of increase.

Embodiment 3

Figure 11:
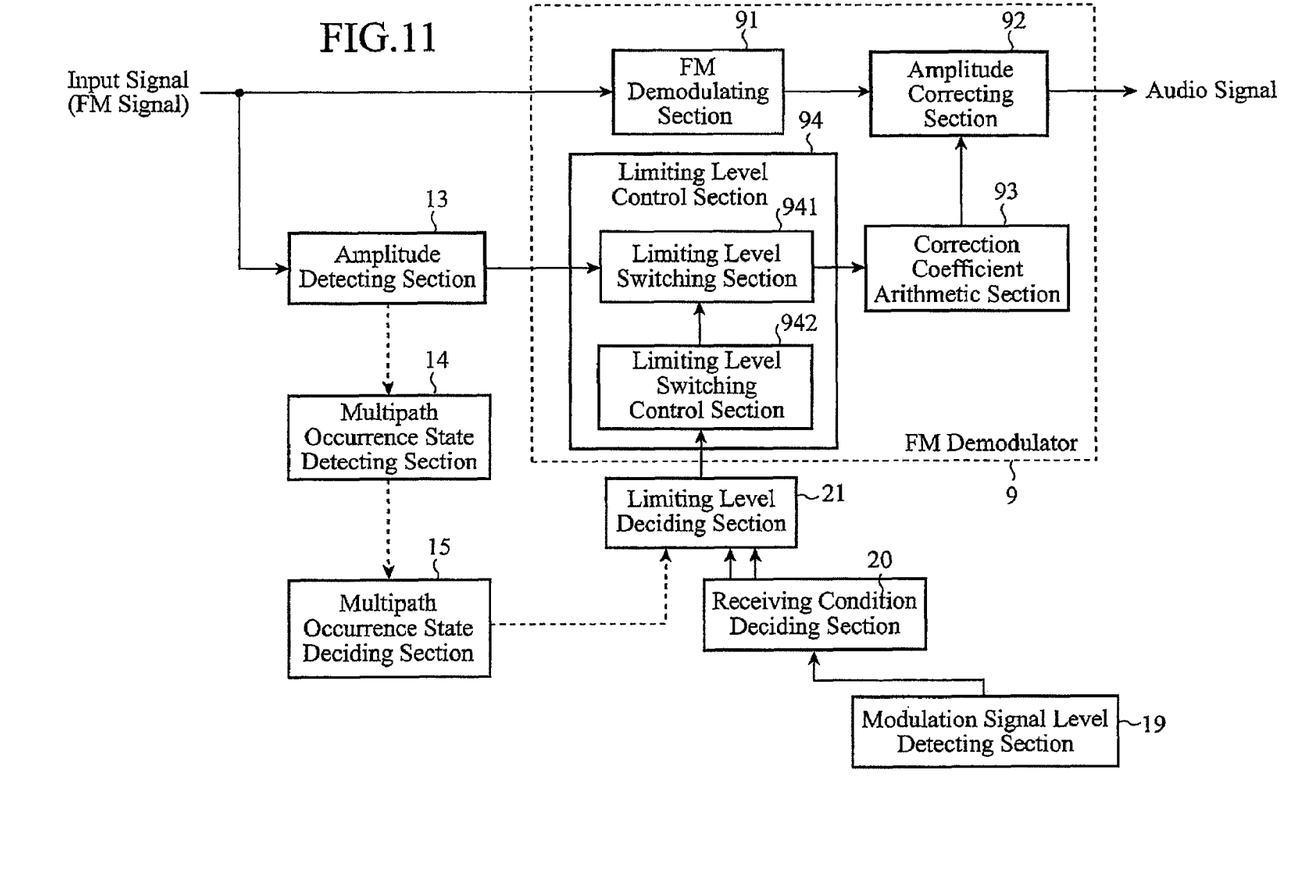
FIG. 11 is a block diagram showing a circuit configuration of the FM demodulator and its surroundings shown for explaining the operation of a radio receiver of an embodiment 3 in accordance with the present invention.

FIG. 11 is a block diagram showing a circuit configuration of the FM demodulator 9 and its surroundings when using the multipath occurrence state and the modulation signal level as the parameters for controlling the operation limitations on the amplitude correction.

The operation of the radio receiver (FM radio receiver) of the embodiment 3 in accordance with the present invention will be described in detail with reference to FIG. 11 below.

The embodiment 3 has a configuration different from the embodiment 1 shown in FIG. 9 in that it supplies the limiting level control section 94 (the limiting level switching control section 942 thereof) of the FM demodulator 9 not only with the multipath occurrence state from the multipath occurrence state deciding section 15, but also with the output of the limiting level deciding section 21 that adjusts the operation limiting level of the amplitude correction in accordance with the multipath occurrence state and the modulation signal level from the modulation signal level detecting section 19.

More specifically, when the modulation signal level is low, the multipath noise has a tendency to be conspicuous, but an uncomfortable feeling such as audio distortion due to the operation limitations on the amplitude correction has a tendency to be inconspicuous. In contrast, when the modulation signal level is high, the multipath noise has a tendency to be inconspicuous, but the uncomfortable feeling such as audio distortion due to the operation limitations on the amplitude correction has a tendency to be conspicuous. Thus, according to the output of the limiting level deciding section 21, the present embodiment can tighten the operation limitations on the amplitude correction when the multipath occurrence is great and the modulation signal level is in the direction of reduction, and lighten the operation limitations on the amplitude correction when the multipath occurrence is small and the modulation signal level is in the direction of increase.

As described above, according to the embodiment 3, detecting the multipath occurrence state and the modulation signal level and using them as the parameters for controlling the operation limitations on the amplitude correction, it can suppress the shortage of removing the multipath noise due to the insufficient operation limiting level of the amplitude correction, and suppress the occurrence of the audio distortion due to the excessive operation limiting level of the amplitude correction.

More specifically, when the output of the amplitude detecting section 13 is smaller than the reference value, the limiting level control section 94 (limiting level switching section 941) of the FM demodulator 9 supplies the correction coefficient arithmetic section 93 with the decision result of the limiting level deciding section 21, thereby being able to reduce the multipath noise effectively when the multipath occurrence is large and the received field level is in the direction of reduction by tightening the operation limitations on the amplitude correction, and to prevent the harmful effect of generating the audio distortion due to the excessive operation limitations on the amplitude correction when the multipath occurrence is small and the received field level is in the direction of increase by lightening the operation limitations on the amplitude correction.

Embodiment 4

Figure 12:
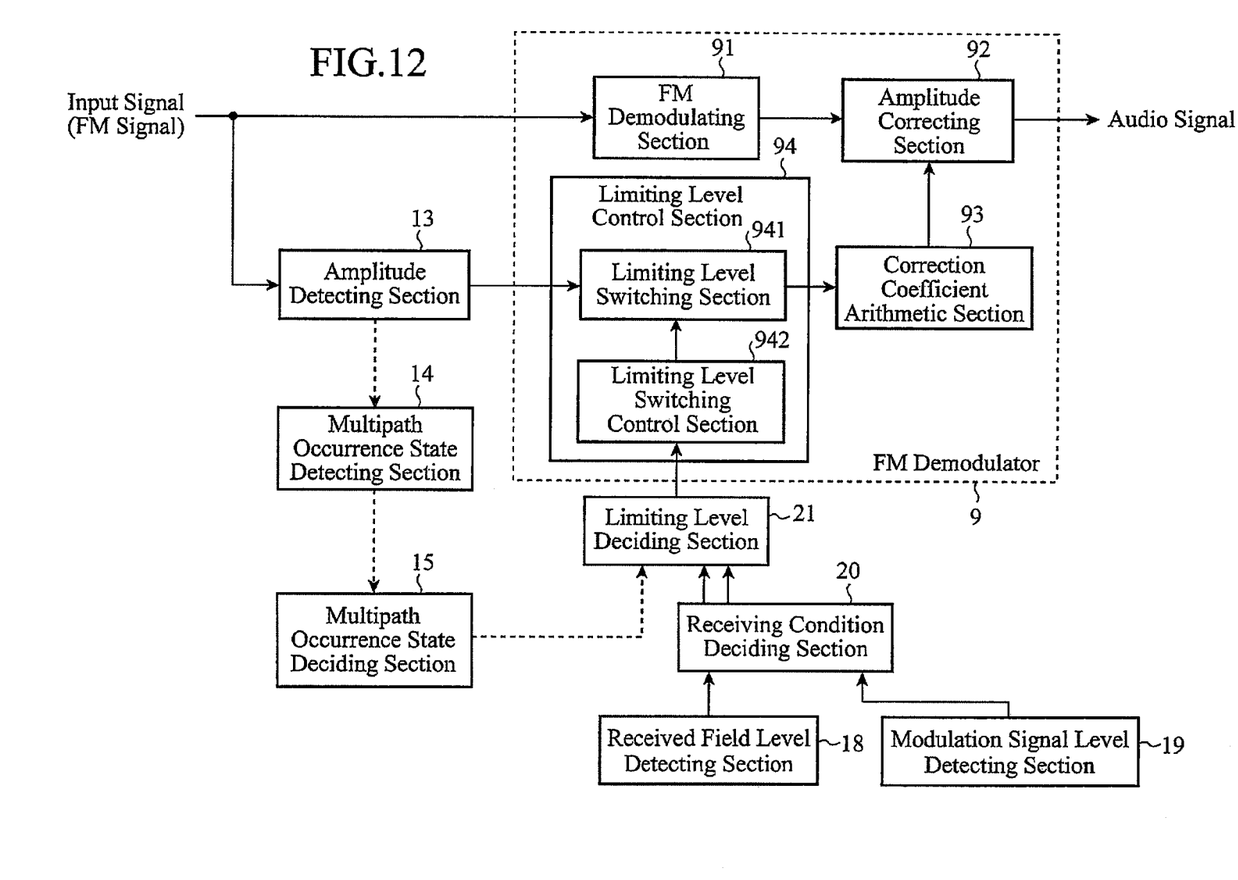
FIG. 12 is a block diagram showing a circuit configuration of the FM demodulator and its surroundings shown for explaining the operation of a radio receiver of an embodiment 4 in accordance with the present invention.

FIG. 12 is a block diagram showing a circuit configuration of the FM demodulator 9 and its surroundings when using the multipath occurrence state, the received field level and the modulation signal level as the parameters for controlling the operation limitations on the amplitude correction.

The operation of the radio receiver (FM radio receiver) of the embodiment 4 in accordance with the present invention will be described in detail with reference to FIG. 12 below.

The embodiment 4 has a configuration different from the embodiment 1 shown in FIG. 9 in that it supplies the limiting level control section 94 (the limiting level switching control section 942 thereof) of the FM demodulator 9 not only with the multipath occurrence state from the multipath occurrence state deciding section 15, but also with the output of the limiting level deciding section 21 that adjusts the operation limiting level of the amplitude correction of the FM demodulator 9 in accordance with the multipath occurrence state, the received field level detected by the received field level detecting section 18 and the modulation signal level detected by the modulation signal level detecting section 19.

As described above, when the received field level is low, the occurrence frequency of the multipath noise increases, but on the contrary when the received field level is high, the occurrence frequency of the multipath noise decreases. In addition, when the modulation signal level is low, the multipath noise has a tendency to be conspicuous, but an uncomfortable feeling such as audio distortion due to the operation limitations on the amplitude correction has a tendency to be inconspicuous. In contrast, when the modulation signal level is high, the multipath noise has a tendency to be inconspicuous, but the uncomfortable feeling such as audio distortion due to the operation limitations on the amplitude correction has a tendency to be conspicuous.

For this reason, according to the output of the limiting level deciding section 21, the operation limitations on the amplitude correction can be tightened when the multipath occurrence is large and when the received field level is low and the modulation signal level is in the direction of reduction, and can be lightened when the multipath occurrence is small and when the received field level is high and the modulation signal level is in the direction of increase.

As described above, according to the embodiment 4, detecting the multipath occurrence state, the received field level and the modulation signal level, and using them as the parameters for controlling the operation limitations on the amplitude correction, it can suppress the shortage of removing the multipath noise due to the insufficient operation limiting level of the amplitude correction, and suppress the occurrence of the audio distortion due to the excessive operation limiting level of the amplitude correction.

More specifically, when the output of the amplitude detecting section 13 is smaller than the reference value, the limiting level control section 94 (limiting level switching section 941) of the FM demodulator 9 supplies the correction coefficient arithmetic section 93 with the decision result of the limiting level deciding section 21 so that the output of the limiting level deciding section 21 can tighten the operation limitations on the amplitude correction when the multipath occurrence is large and the received field level and the modulation signal level are in the direction of reduction, thereby being able to reduce the multipath noise effectively. In addition, it can prevent the harmful effect that the audio distortion occurs because of the excessive operation limitations on the amplitude correction by lightening the operation limitations on the amplitude correction when the multipath occurrence is small and the received field level and the modulation signal level are in the direction of increase.

As described above, according to the radio receiver in accordance with the present invention, it carries out appropriate control to suppress the multipath noise in response to the receiving conditions taking the multipath occurrence state into account, thereby being able to further improve the reception quality. Accordingly, it achieves a marked effect when applied to an onboard FM radio receiver which involves movement because of being mounted on a vehicle, and which has the receiving conditions fluctuating moment by moment.

Incidentally, although only the FM radio receiver is shown as an example of the radio receiver of the foregoing embodiments 1-4 in accordance with the present invention, it is not limited to the FM radio receiver, but is applicable to all the radio receivers such as televisions and mobile phones capable of receiving radio waves broadcast or transmitted via a broadcasting station or base station.

In addition, as for the functions of the multipath occurrence state detecting section 14, multipath occurrence state deciding section 15 and limiting level deciding section 21 shown in FIG. 1, all of them can be implemented by software or at least part of them can be achieved by hardware.

For example, as for the data processing in the limiting level deciding section 21 that decides the operation limiting level of the amplitude correction in accordance with the multipath occurrence state detected with the multipath occurrence state detecting section 14, it can be implemented on a computer with one or more programs, or at least part of it can be achieved by hardware.

INDUSTRIAL APPLICABILITY

As described above, to suppress the multipath noise by carrying out appropriate control in accordance with the receiving conditions taking the multipath occurrence state into account, a radio receiver in accordance with the present invention is configured in such a manner that it includes an amplitude detecting section for detecting an amplitude level of a received radio wave, a multipath occurrence state detecting section for monitoring the amplitude level output from the amplitude detecting section, and for detecting a degree of a multipath occurrence state, a multipath occurrence state deciding section for deciding an operation limiting level of the amplitude correction according to the degree of the multipath occurrence state detected by the multipath occurrence state detecting section, a receiving condition deciding section for deciding receiving conditions of the radio wave according to at least one of a received field level and a modulation signal level, and a limiting level deciding section for adjusting the operation limiting level of the amplitude correction output from the multipath occurrence state deciding section according to a receiving condition decision result output from the receiving condition deciding section and that it provides the operation limitations on the amplitude correction of the modulator. Accordingly, it is suitably applied to radio receivers such as radios, televisions, or mobile phones, and particularly to onboard FM radio receivers which involve movement because of being mounted on a vehicle, and which have the receiving conditions fluctuating moment by moment.

What is claimed is:

1. A radio receiver that suppresses multipath noise by imposing operation limitations on amplitude correction for removing amplitude variation responding components of an input signal performed by a demodulator, the radio receiver comprising:
    an amplitude detecting section for detecting an amplitude level of a signal input to the demodulator;
    a multipath occurrence state detecting section for monitoring the amplitude level output from the amplitude detecting section, and for detecting a strong multipath occurrence state if an instantaneous drop is small, and detecting a weak multipath occurrence state if the instantaneous drop is large;
    a multipath occurrence state deciding section for setting an operation limiting level of the amplitude correction in a direction of increase if a degree of the multipath occurrence state detected by the multipath occurrence state detecting section is strong, and setting the operation limiting level of the amplitude correction in a direction of decrease if the degree of the multipath occurrence state is weak;
    a receiving condition deciding section for deciding receiving conditions of the radio wave according to at least one of a received field level and a modulation signal level; and
    a limiting level deciding section for making the operation limiting level of the amplitude correction output from the multipath occurrence state deciding section large if a receiving condition decision result output from the receiving condition deciding section is large, and making the operation limiting level of the amplitude correction output from the multipath occurrence state deciding section small if the receiving condition decision result is small.

2. The radio receiver according to claim 1, further comprising:
    a received field level detecting section for detecting the receiving conditions from the received field level, wherein
    the limiting level deciding section adjusts the operation limiting level of the amplitude correction in accordance with the multipath occurrence state detected by the multipath occurrence state detecting section and the received field level detected by the received field level detecting section.

3. The radio receiver according to claim 1, further comprising:
a modulation signal level detecting section for detecting the receiving conditions from the modulation signal level of the demodulator, wherein
the limiting level deciding section adjusts the operation limiting level of the amplitude correction in accordance with the multipath occurrence state detected by the multipath occurrence state detecting section and the modulation signal level detected by the modulation signal level deciding section.

4. The radio receiver according to claim 1, further comprising:
a received field level detecting section for detecting the receiving conditions from the received field level; and
a modulation signal level detecting section for detecting the receiving conditions from the modulation signal level, wherein
the limiting level deciding section adjusts the operation limiting level of the amplitude correction in accordance with the multipath occurrence state detected by the multipath occurrence state detecting section, the received field level detected by the received field level detecting section, and the modulation signal level detected by the modulation signal level deciding section.

* * * * *